(12) United States Patent
Crafts

(10) Patent No.: US 6,886,989 B2
(45) Date of Patent: May 3, 2005

(54) ALIGNMENT OF FIBER OPTIC BUNDLE TO ARRAY WAVEGUIDE USING PINS

(75) Inventor: Douglas E. Crafts, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/738,686

(22) Filed: Dec. 15, 2000

(65) Prior Publication Data

US 2004/0057670 A1 Mar. 25, 2004

(51) Int. Cl.$^7$ ................................................ G02B 6/40
(52) U.S. Cl. ............................................. 385/54
(58) Field of Search ........................... 385/51, 53, 54, 385/56

(56) References Cited

U.S. PATENT DOCUMENTS

| | | | | |
|---|---|---|---|---|
| 4,973,127 A | * | 11/1990 | Cannon, Jr. et al. | 385/56 |
| 4,983,012 A | * | 1/1991 | Saito et al. | 385/56 |
| 5,037,179 A | * | 8/1991 | Bortolin et al. | 385/54 |
| 5,535,295 A | | 7/1996 | Matsumoto | |
| 5,574,811 A | | 11/1996 | Bricheno et al. | |
| 5,611,010 A | * | 3/1997 | Shiino et al. | 29/750 |
| 5,613,024 A | | 3/1997 | Shahid | |
| 5,619,605 A | * | 4/1997 | Ueda et al. | 385/54 |
| 5,625,730 A | * | 4/1997 | Ishikawa et al. | 385/49 |
| 5,633,968 A | * | 5/1997 | Sheem | 385/53 |
| 5,689,599 A | * | 11/1997 | Shahid | 385/83 |
| 5,721,798 A | * | 2/1998 | Kanda et al. | 385/58 |
| 5,818,994 A | * | 10/1998 | Hehmann | 385/89 |
| 5,859,943 A | | 1/1999 | Asakura et al. | |
| 6,160,936 A | * | 12/2000 | You et al. | 385/49 |
| 6,181,855 B1 | * | 1/2001 | Richter et al. | 385/52 |
| 6,240,235 B1 | | 5/2001 | Uno et al. | |
| 6,241,399 B1 | | 6/2001 | Nobuhara | |
| 6,243,518 B1 | * | 6/2001 | Lee et al. | 385/59 |
| 6,375,365 B1 | | 4/2002 | Chau | |
| 6,394,663 B2 | | 5/2002 | Nakagawa et al. | |
| 2001/0010742 A1 | | 8/2001 | Nakagawa et al. | |

FOREIGN PATENT DOCUMENTS

| | | |
|---|---|---|
| EP | 0-667-543 A1 | 8/1995 |
| EP | 0 940 699 A1 | 9/1999 |
| GB | 2-219-414 A | 12/1989 |
| JP | 60-158410 | 12/1985 |
| JP | 01-142508 | 6/1989 |
| JP | 02-156211 A | 6/1990 |
| JP | 05/173038 | 7/1993 |
| JP | 07/020358 | 1/1998 |
| JP | 09-230168 A | 9/1998 |
| JP | 10-206685 | 11/1998 |
| WO | PCT/US 01/43731 | 9/2002 |
| WO | WO 02/101434 | 12/2002 |

* cited by examiner

Primary Examiner—Thanh-Tam Le
(74) Attorney, Agent, or Firm—Kenneth J. Cool

(57) ABSTRACT

A device and method for aligning a fiber optic bundle with an array waveguide uses pins that partially extend into both the fiber optic bundle and the array waveguide to achieve course alignment. In one embodiment, the pins are inserted into holes formed by V-grooves in the fiber optic bundle. Finely aligning the fiber optic bundle and the array waveguide may be done by manual adjustment.

18 Claims, 7 Drawing Sheets

ALIGNMENT OF FIBER OPTIC BUNDLE TO ARRAY WAVEGUIDE USING PINS

CROSS-REFERENCE TO RELATED APPLICATIONS

This application is related to:

U.S. patent application Ser. No. 09/738,799, filed Dec. 15, 2000, entitled "Alignment of Fiber Optic Bundle to Array Waveguide Using an Epoxy," and U.S. Pat. No. 6,628.865, filed Dec. 15, 2000 and issued Sep. 30, 2003, entitled "Alignment of Optical Fibers to an Etched Array Waveguids."

BACKGROUND OF THE INVENTION

1. Field of the Invention

The described invention relates to the field of optics. In particular, the invention relates to coupling a fiber optic bundle to a planar photonic structure, such as an array waveguide ("AWG").

2. Description of Related Art

Fiber optic bundles and AWGs are both used for propagating light. A fiber optic bundle has multiple optical fibers for propagating light, and an AWG has multiple channels for propagating light within. Coupling a fiber optic bundle to an AWG, however, is not easy. Manual alignment requires detecting and maximizing light connectivity between the fiber optic bundle and the AWG. Once a good connection is obtained, permanently fixing the alignment is required.

FIG. 1A shows a prior art fiber optic bundle 10. The fiber optic bundle 10 comprises multiple optical fibers 12 sandwiched between two retainers 16 and 18. The retainers are substrates made of silicon, for example, that are appropriately masked with a suitable etch mask. Thereafter, symmetrically spaced unmasked areas of the substrate are exposed to a chosen anisotropic etchant, such as hot KOH or ethylenediamine. This etchant preferentially attacks a chosen (100) crystallographic plane of the silicon substrate and preferentially etches in a vertical direction until V-shaped grooves ("V-grooves") are attained. Upon completion of these V-shaped grooves, optical fibers are placed in the grooves and come to rest in alignment with the center of the V-grooves between the retainers 16 and 18.

FIG. 1B shows a prior art single retainer without the optical fibers. The two retainers 16 and 18 sandwich the optical fibers together as a termination block for the fiber optic bundle. The termination block maintains the spacing between the optical fibers and allows for easily handling the fiber optic bundle. The ends of the optical fibers 22 are typically polished after being set in the termination block.

FIG. 2 shows a prior art example of an AWG. The AWG comprises multiple channels 30 running through the AWG. The AWG may comprise a glass, silicon, oxide or polymer substrate. The channels are made of materials having a slightly higher index of refraction than the rest of the AWG. AWGs and fiber optic bundles may be made with various numbers of channels.

FIG. 3 shows a side view of a fiber optic bundle being aligned to an AWG 42. The optical fibers of the fiber optic bundle and the channels of the AWG have identical spacings and number. A dotted line 45 shows the channels in the AWG. An epoxy 50 is used to hold the termination block 40 of the fiber optic bundle to the AWG 42, but alignment must be maintained. It is difficult to achieve alignment, i.e., photonically couple the optical fibers to the AWG channels, and then to epoxy without losing alignment.

DETAILED DESCRIPTION

There are several ways of improving alignment between a fiber optic bundle and an AWG. In some cases, quick coarse alignment is followed up with finely aligning the fiber optic bundle and AWG afterwards.

Figure 4:
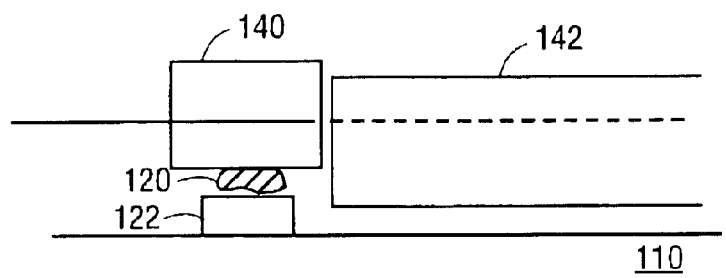
FIG. 4 shows a first embodiment for aligning a fiber optic bundle to an AWG.

FIG. 4 shows a first embodiment for aligning a fiber optic bundle to an AWG. In this embodiment, the AWG 142 is mounted to a base 110. The fiber optic bundle's termination head 140 is also mounted to the base 110 via a high viscosity epoxy 120. In one embodiment, a spacer 122 attached to the base 110 may be used to reduce the thickness of epoxy 120 employed.

Figure 1A:
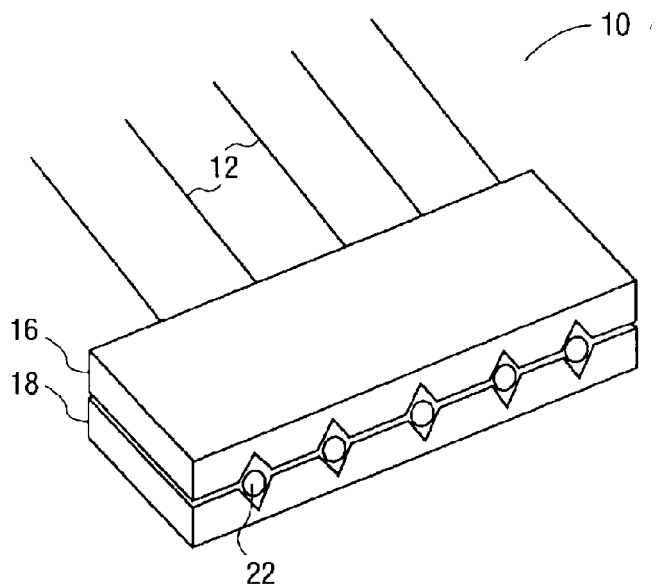
FIG. 1A shows a prior art fiber optic bundle
Figure 1B:
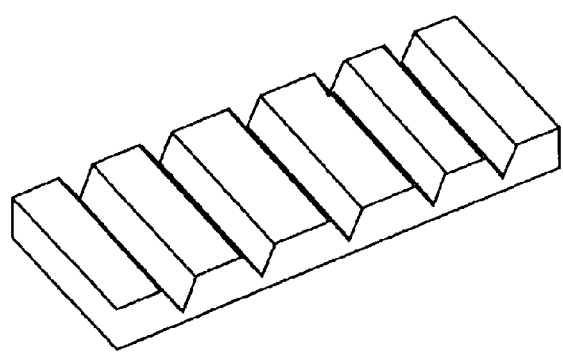
FIG. 1B shows a prior art single retainer without the optical fibers.
Figure 2:
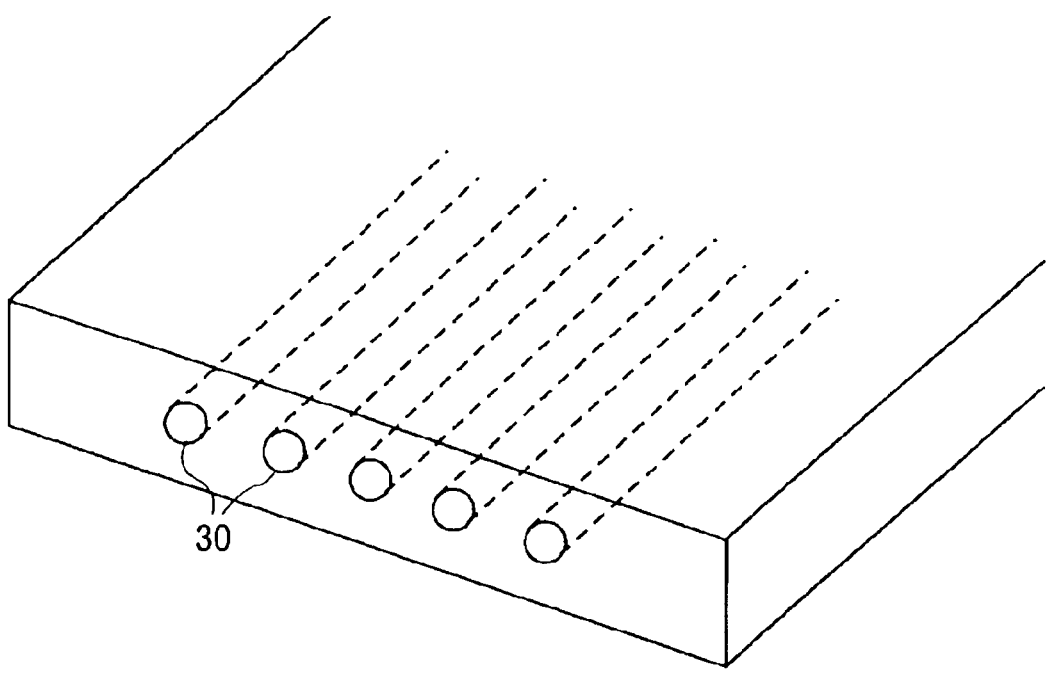
FIG. 2 shows a prior art example of an AWG.
Figure 3:
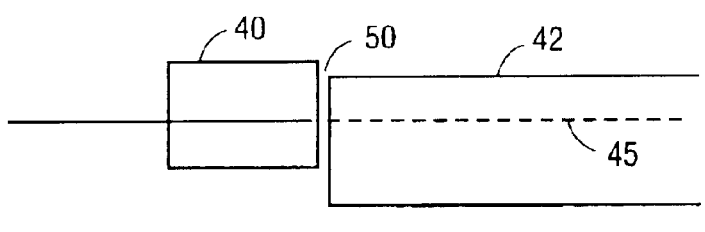
FIG. 3 shows a side view of a fiber optic bundle being aligned to an AWG.

Typical epoxies such as that used in prior art FIG. 3 shrink when cured. This post-bond shrinkage is not a problem in the prior art FIG. 3 since it pulls the termination head 40 closer to the AWG 42. However, if the epoxy of FIG. 4 shrinks, alignment of the fiber optic bundle with the AWG will suffer, as the termination block 140 is pulled toward the base 110.

An epoxy having a silicate content of over 70% by volume has been found to reduce shrinkage. Additionally, the high silicate content makes the epoxy very viscous allowing for manual alignment being maintained after being achieved. Thus, alignment of the termination head 140 and the AWG 142 can be achieved without significant post-bond shrinkage as the epoxy is cured by heat or other methods.

Raising the silicate content of the epoxy to up to 90% by volume reduces the post-bond shrinkage even more. However, as the silicate content is increased, the shear strength of the bond is reduced, so a balancing between post-bond shrinkage and shear strength should be performed.

The alignment method using the high viscosity epoxy described provides a robust bond area for achieving and maintaining alignment between the fiber optic bundle and the AWG. Additionally, a gel having a refractive index matching the optical fibers and the AWG channels may be dispensed between the fiber optic bundle and the AWG. This helps to prevent light from scattering at an air gap between the fiber optic bundle and the AWG.

Figure 5A:
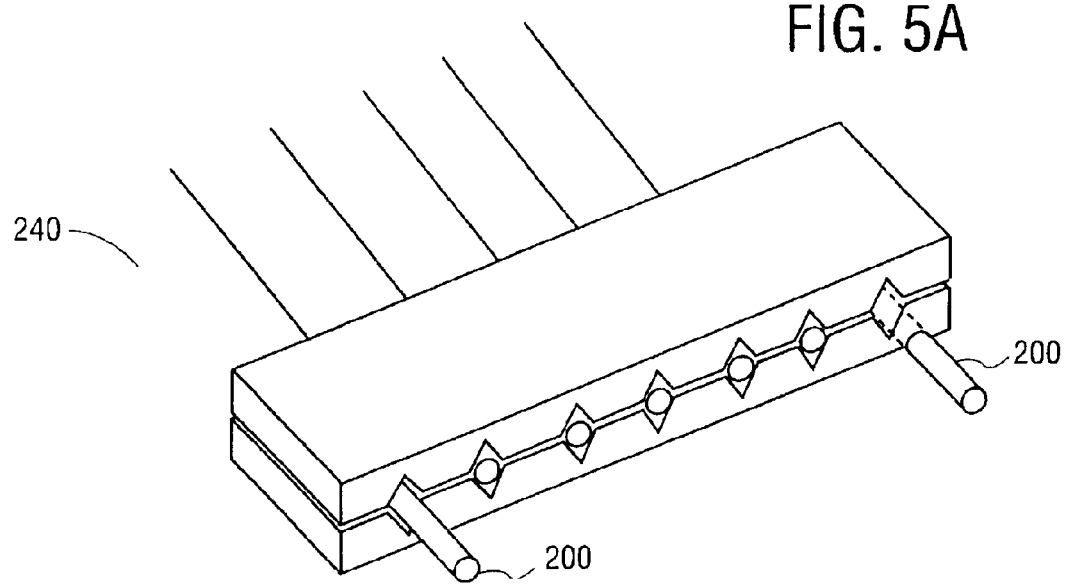
FIG. 5A shows a second embodiment for aligning a fiber optic bundle wit h an AWG using pins (or dowels/rods).

FIG. 5A shows a second embodiment for aligning a fiber optic bundle with an AWG using pins (or dowels/rods). In one embodiment, the termination head is made with optical fibers filling all of the grooves except for a groove at each end. The ends of the optical fibers are then polished, as usual. Pins 200 can then be inserted into the open grooves in the termination block of the fiber optic bundle.

Figure 5B:
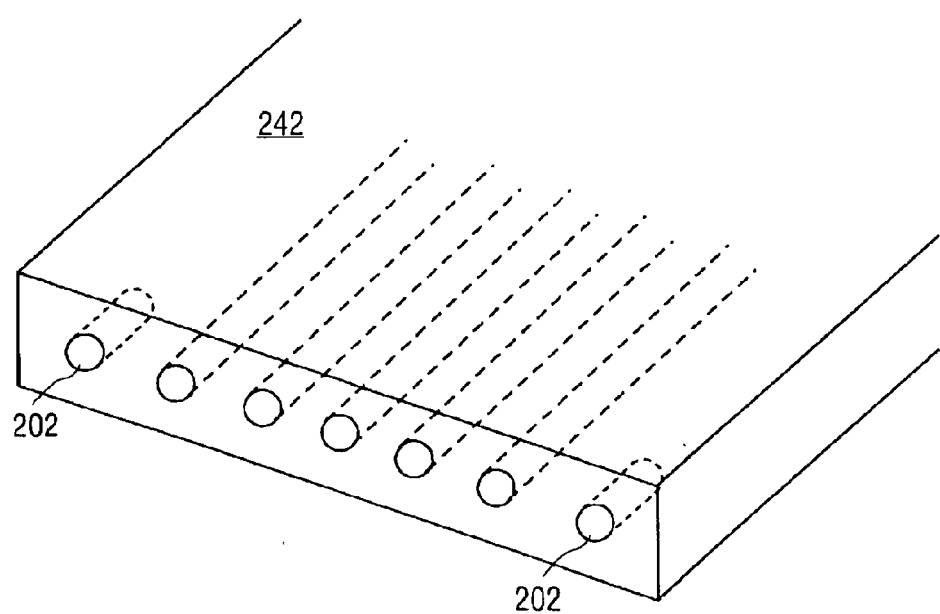
FIG. 5B shows an AWG corresponding to the fiber optic bundle of FIG. 5A.

FIG. 5B shows an AWG corresponding to the fiber optic bundle of FIG. 5A. The AWG has recesses 202. In one embodiment, the AWG recesses are initially filled with materials different from the rest of the AWG. This allows selective etching to form the recesses 202. However, other methods of making the recesses are possible.

The pins 200 of the fiber optic bundle fit snugly into the recesses 202 of the AWG to provide coarse alignment. Additional manual adjustment to more finely align the fiber optic bundle to the AWG may be performed.

Figure 6:
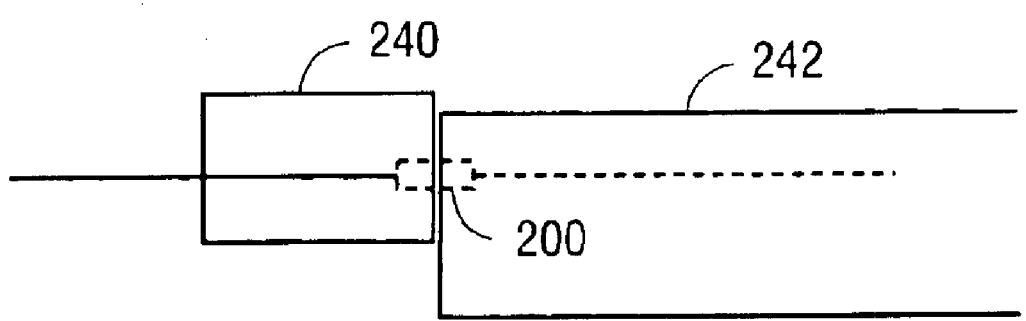
FIG. 6 shows a cross section of a fiber optic block and an AWG joined with pins 200 to perform a coarse alignment.

FIG. 6 shows a cross section of a fiber optic block and an AWG joined with pins 200 to perform a coarse alignment. A gel can be dispensed between the fiber optic bundle and the AWG to provide better photonic coupling, and an epoxy is used to permanently fix the alignment.

Figure 7:
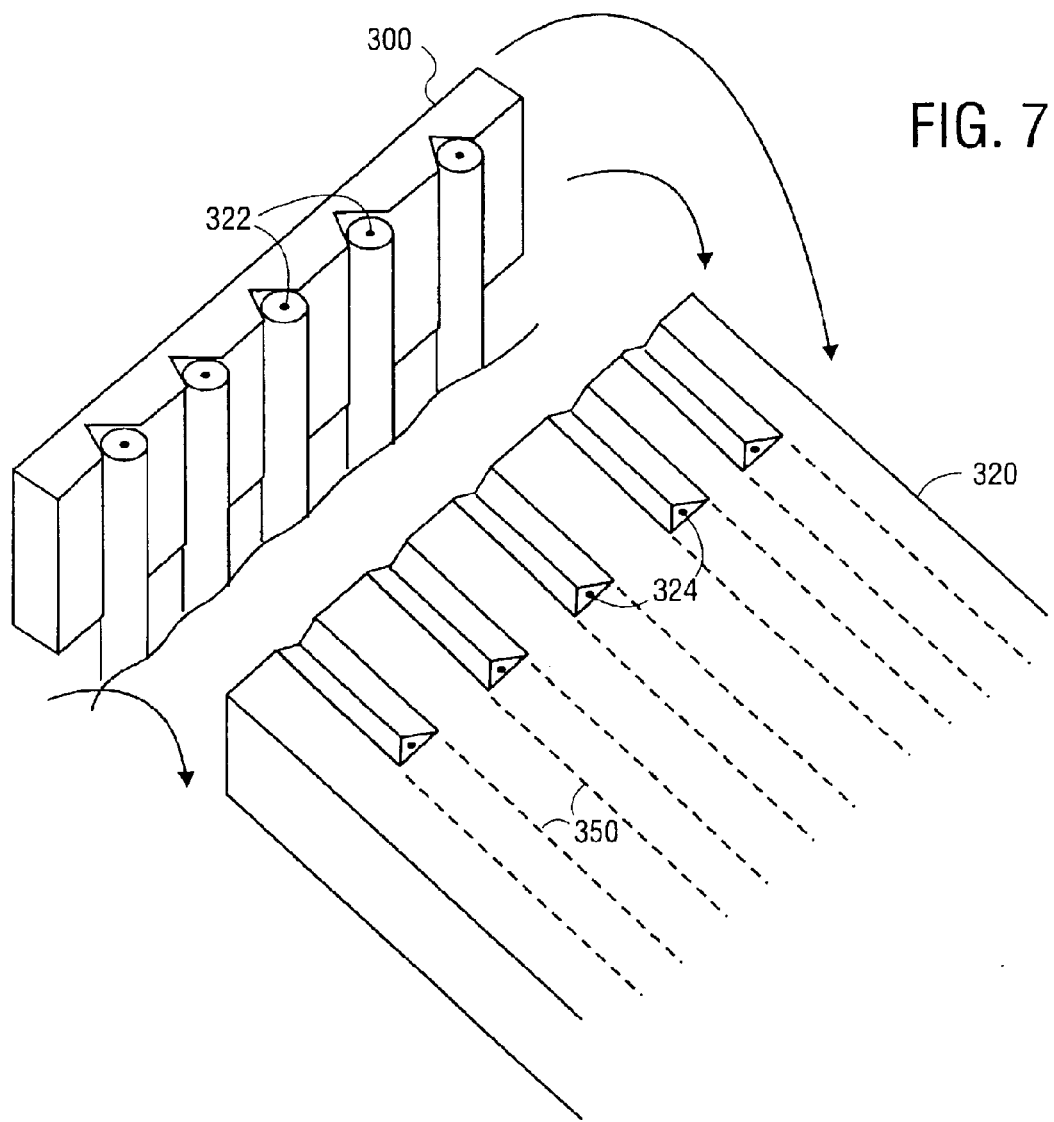
FIG. 7 shows a third embodiment for aligning optical fibers to an AWG.

FIG. 7 shows a third embodiment for aligning optical fibers to an AWG. In this embodiment only one retainer 300 is used in the termination block of the fiber optic bundle, and the optical fibers are attached into the one retainer 300. V-grooves are etched into the AWG's substrate in the same way that the retainer was etched, however the V-grooves on the AWG extend only a predetermined distance across the AWG from an edge of the AWG.

The one retainer 300 is placed over the V-grooves on the AWG 320 to sandwich the optical fibers between the retainer 300 and the AWG 320. The optical fibers come to rest within the V-grooves of the AWG 320. The ends of the optical fibers 322 are butted up against the ends of the AWG's V-grooves 324.

The interlocking compatibility between the retainer 300 and the V-grooves of the AWG 320 provide for quick coarse alignment of the optical fibers with the channels 350 of the AWG. Manual adjustment may then be performed to more finely align the optical fibers with the AWG.

Figure 8:
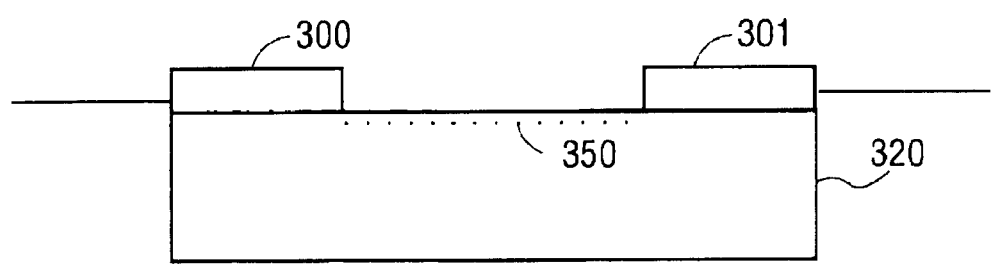
FIG. 8 shows a side view of the retainer placed over the etched AWG having channels within.
Figure 9:
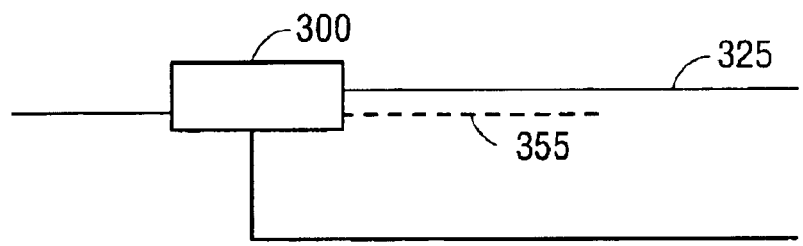
FIG. 9 shows another embodiment in which the AWG is etched a predetermined depth below the AWG surface before etching the V-grooves.

FIG. 8 shows a side view of the retainer 300 placed over the etched AWG 320 having channels 350 within. FIG. 9 shows another embodiment in which the AWG 325 is etched a predetermined depth below the AWG surface before etching the V-grooves. This allows a better coupling to channels 355 that are deeper below the AWG surface.

In one embodiment, over-etching the AWG provides for a better ability to manually align the optical fibers and the AWG afterwards. As previously described, gel or epoxy having a refractive index matching the optical fibers and the channels of the AWG can be dispensed between the retainer and AWG.

Thus, a device and method of aligning optical fibers in a fiber optic bundle to a waveguide is disclosed. However, the specific embodiments and methods described herein are merely illustrative. Numerous modifications in form and detail may be made without departing from the scope of the invention as claimed below. Rather, the invention is limited only by the scope of the appended claims.

What is claimed is:

1. A method of aligning a fiber optic bundle with an array waveguide comprising:

inserting pins into holes formed in both the fiber optic bundle and the array waveguide, wherein the holes fanned in the fiber optic bundle are farmed by placing two etched substrates together;

pressing the fiber optic bundle and the array waveguide together so that the pins extend into bath the fiber optic bundle and the array waveguide; and finely aligning optical fibers in the fiber optic bundle with channels of the array waveguide; and permanently bonding the fiber optic bundle to the array waveguide.

2. The method of claim 1, wherein permanently bonding the fiber optic bundle to the array waveguide further comprises:

applying an epoxy to bond the fiber optic bundle to the array waveguide.

3. The method of claim 2 further comprising:

dispensing an optical gel between the fiber optic bundle and the array waveguide.

4. The method of claim 3, wherein the optical gel has an index of refraction substantially similar to channels in the array waveguide.

5. The method of claim 4 further comprising:

curing the epoxy while maintaining alignment between the optical fibers and the channels of the array waveguide.

6. A method of aligning a fiber optic bundle with an array waveguide comprising:

coarsely aligning the fiber optic bundle with the array waveguide by inserting pins into holes formed in an end of the fiber optic bundle, wherein the holes formed in the fiber optic bundle are formed by placing two etched substrates together, inserting opposite ends of the pins into the array waveguide, and pressing the fiber optic bundle and the array waveguide together; and finely aligning the fiber optic bundle with the array waveguide by adjusting the fiber optic bundle and the array waveguide to improve photonic coupling between optical fibers of the fiber optic bundle and channels of the array waveguide; and permanently bonding the fiber optic bundle to the array waveguide.

7. The method of claim 6, wherein permanently bonding the fiber optic bundle to the array waveguide further comprises:

dispensing an epoxy between the fiber optic bundle and the array waveguide.

8. The method of claim 7, wherein the dispensing the epoxy is performed by dispensing an epoxy having an index of refraction substantially similar to the channels of the array waveguide.

9. The method of claim 1, wherein the two etched substrates are placed together to form multiple holes, and the multiple holes, and the multiple holes are filled by optical fibers except for the holes with the pins inserted in them.

10. The method of claim, 6, wherein the two etched substrates are placed together to form multiple holes, and the multiple holes are filled by optical fibers except for the holes with the pins inserted in them.

11. A method comprising:

aligning a fiber optic bundle and an array waveguide by inserting one or more selected from pins, dowels, and rods into one or more holes in the fiber optic bundle and the array waveguide and pressing the fiber optic bundle and the array waveguide together;

finely aligning optical fibers in the fiber optic bundle with channels of the array waveguide; and permanently bonding the fiber optic bundle to the array waveguide.

12. The method of claim 11, wherein said bonding comprises bonding with an epoxy.

13. The method of claim 11, wherein said finely aligning comprises manual adjustment.

14. The method of claim 11, wherein said finely aligning comprises adjusting the fiber optic bundle and the array waveguide to improve photonic coupling between optical fibers of the fiber optic bundle and channels of the array waveguide.

15. A method comprising:
   coarsely aligning a fiber optic bundle and an arrary waveguide using one or more selected from pins, dowels, and rods;
   finely aligning optical fibers in the fiber optic bundle with channels of the array waveguide; and
   permanently bonding the fiber optic bundle to the array waveguide.

16. The method of claim 15, wherein said finely aligning comprises manual adjustment.

17. The method of claim 15, wherein said finely aligning comprises adjusting the fiber optic bundle and the array waveguide to improve photonic coupling between optical fibers of the fiber optic bundle and channels of the array waveguide.

18. The method of claim 15, wherein said bonding comprises bonding with an epoxy.

* * * * *

UNITED STATES PATENT AND TRADEMARK OFFICE
CERTIFICATE OF CORRECTION

PATENT NO. : 6,886,989 B2
DATED : May 3, 2005
INVENTOR(S) : Crafts

It is certified that error appears in the above-identified patent and that said Letters Patent is hereby corrected as shown below:

Column 4,
Line 2, delete "bath" and insert -- both --.

Signed and Sealed this

Twenty-third Day of August, 2005

JON W. DUDAS
*Director of the United States Patent and Trademark Office*